United States Patent Office 3,574,198
Patented Apr. 6, 1971

3,574,198
(ANDROST-17β-YL)-α-PYRONES AND PROCESS FOR THEIR MANUFACTURE
Kurt Radscheit, Kelkheim, Taunus, Ulrich Stache, Hofheim, Taunus, Werner Fritsch, Neuenhain, Taunus, and Werner Haede, Hofheim, Taunus, Germany, assignors to Farbwerke Hoechst Aktiengesellschaft vormals Meister Lucius & Bruning, Frankfurt am Main, Germany
No Drawing. Filed June 11, 1968, Ser. No. 735,964
Claims priority, application Germany, June 16, 1967, F 52,707; Aug. 25, 1967, F 53,332
Int. Cl. C07c 173/00
U.S. Cl. 260—239.57   3 Claims

ABSTRACT OF THE DISCLOSURE (Androst-17β-yl)-α-pyrones, cardioactive per se and useful as intermediates in the manufacture of scillarenone and scillarenin, and methods for making the same by ring closure of 20-alkoxymethylene-21-carbalkoxymethylene or 20-formyl-21-carbalkoxymethylene steroids derived from 21-dialkoxy-20-keto steroid starting compounds.

This invention relates to (androst-17β-yl)-α-pyrones of the general Formula I

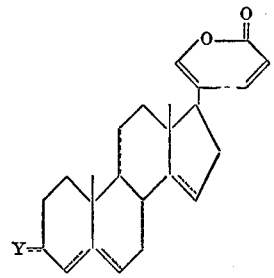

(I)

in which Y is a free or ketalised oxo group, a hydrogen atom and a free or etherified or esterified hydroxyl group, a Δ$^3$- or Δ$^2$- or Δ$^{3,5}$-enol-ether group or Δ$^3$- or Δ$^2$- or Δ$^{3,5}$-enol-ester group or a Δ$^3$- or Δ$^2$- or Δ$^{3,5}$-enamino group. A double bond may be present in the 4-, 5-, 9-, 11-, and/or 14-position. A free, etherified, or esterified hydroxyl group may be in the 4- and/or 6-position, and a free or ketalized oxo group or a free, etherified, or esterified hydroxyl group may be in the 15-position.

The invention also relates to a process for the manufacture of the above compounds, wherein an appropriate 21-dialkoxy-20-ketosteroid-derivative of the general Formula II

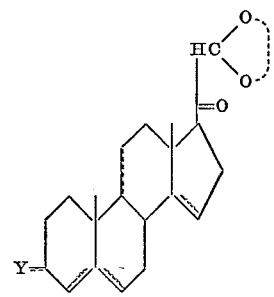

(II)

in which

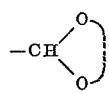

is an open or cyclic acetal-grouping, and Y has the meaning given above, and any keto groups in the 3- and 15-positions are protected as described above, is (a) Subjected to the Wittig reaction with an oxymethyltriphenyl-phosphonium halide of the general Formula III

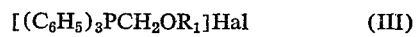

[(C$_6$H$_5$)$_3$PCH$_2$OR$_1$]Hal   (III)

in which R$_1$ is an alkyl, aryl or alkylaryl group, and Hal is a chlorine, bromine or iodine, in the presence of an anhydrous base in an inert organic solvent. The resulting 21-dialkoxy-20-alkoxy- (or -aryloxy- or -alkylaryloxy)-methylene compound of the Formula IV

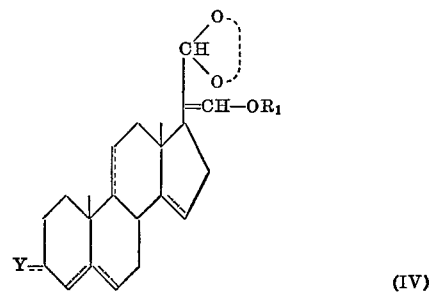

(IV)

is selectively hydrolysed to the corresponding 21-oxo-20-alkoxy- (or aryloxy- or alkylaryloxy)-methylene compound. The latter is reacted with a carbalkoxymethyldialkyl-phosphonate of the general Formula V

(V)

in which R$_2$ and R$_3$ are lower alkyl residues, in the presence of an anhydrous base in an inert organic solvent to form the corresponding 21-carbalkoxymethylene derivative of the formula

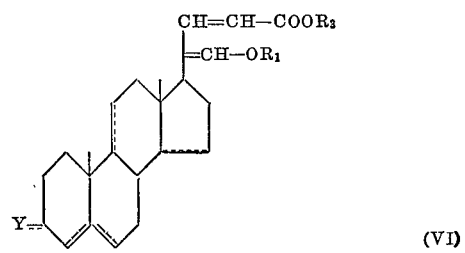

(VI)

The latter is then subjected to ring closure in an acid medium.

In an alternative synthesis, the 21-dialkoxy-20-ketosteroid derivative II is (b) Reacted with a trimethylsulphonium halide or a trimethylsulphoxonium halide of the Formula VII or VIII

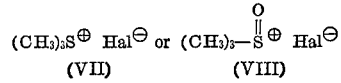

(CH$_3$)$_3$S$^⊕$ Hal$^⊖$ or (CH$_3$)$_3$—S$^⊕$ Hal$^⊖$
        (VII)                    (VIII)

in the presence of an anhydrous organic or inorganic base in an inert organic solvent. The resulting 20,22-oxido-steroid-compound of the Formula IX

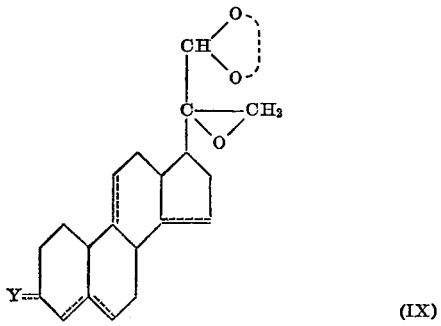

(IX)

is reacted with a hydrohalic acid and the resulting halohydrin compound of the Formula X or XI

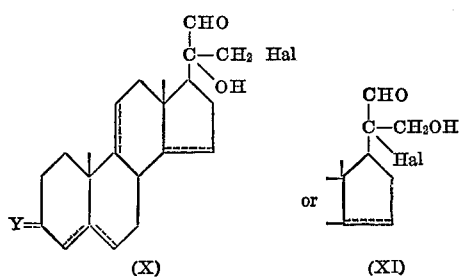

(X)    (XI)

is reacted with an organic or inorganic base to form the corresponding 21-oxo-20,22-oxido-steroid compound. The latter is reacted with a carbalkoxymethyl-dialkylphosphonate of the general Formula XII

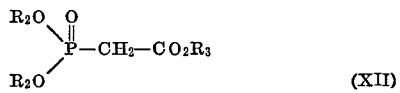

(XII)

in which $R_2$ and $R_3$ have the meanings given above, in the presence of an anhydrous base in an inert organic solvent, or with a carbalkoxymethyl-triphenyl-phosphorane of the Formula XIII $$(C_6H_5)_3P=CH-CO_2R_3 \quad (XIII)$$

in which $R_3$ has the meaning given above, to form the corresponding 21-carbalkoxymethylene - 20,22 - oxidosteroid of the Formula XIV

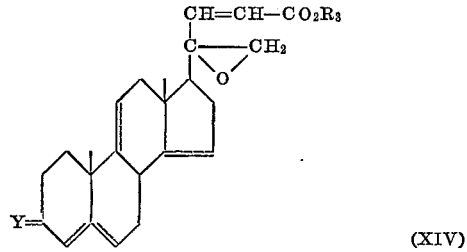

(XIV)

The latter is isomerised with an acid to form the 21-carbalkoxymethylene-20-formyl-compound of the Formula XV

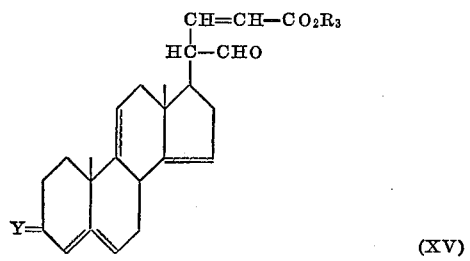

(XV)

and the latter is then subjected to ring closure by means of an acid or a base. As a further alternative in the compound VI or XV the carbalkoxy group is first hydrolysed in an acid or alkaline medium, and the resulting carboxylic acid is then subjected to ring closure in an acid or alkaline medium. Hydrolysed ketal, ester or ether groups are re-ketalised, re-esterified or re-etherified or ketal, ester or ether groups may be subsequently hydrolysed or subjected to ether splitting.

The process of the invention using route (a) is illustrated by way of example as follows:

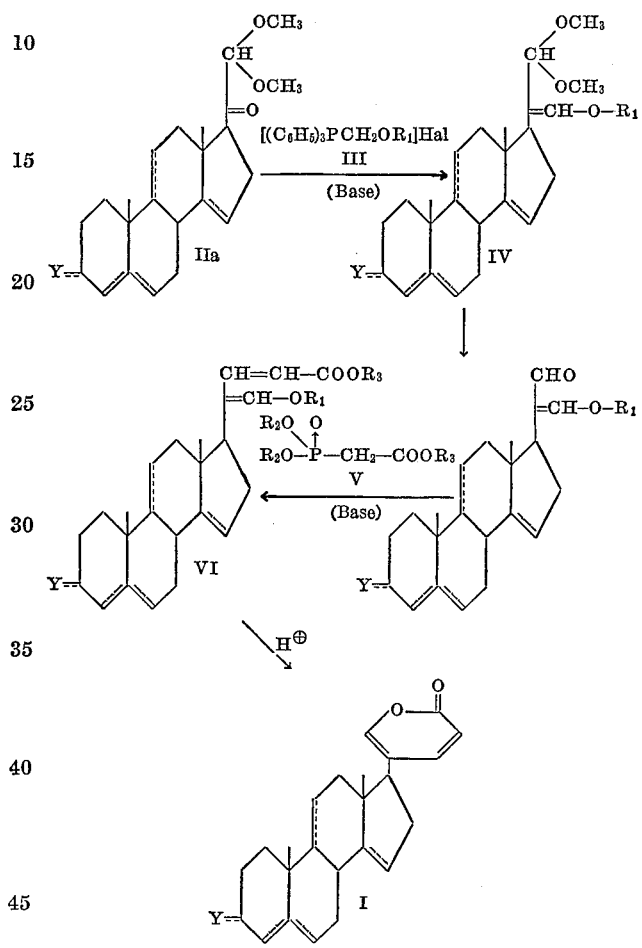

The process of the invention using route (b) is illustrated by way of example as follows:

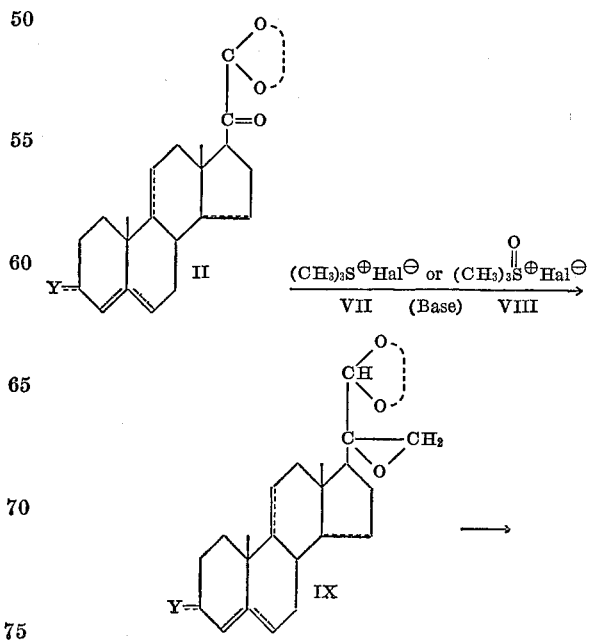

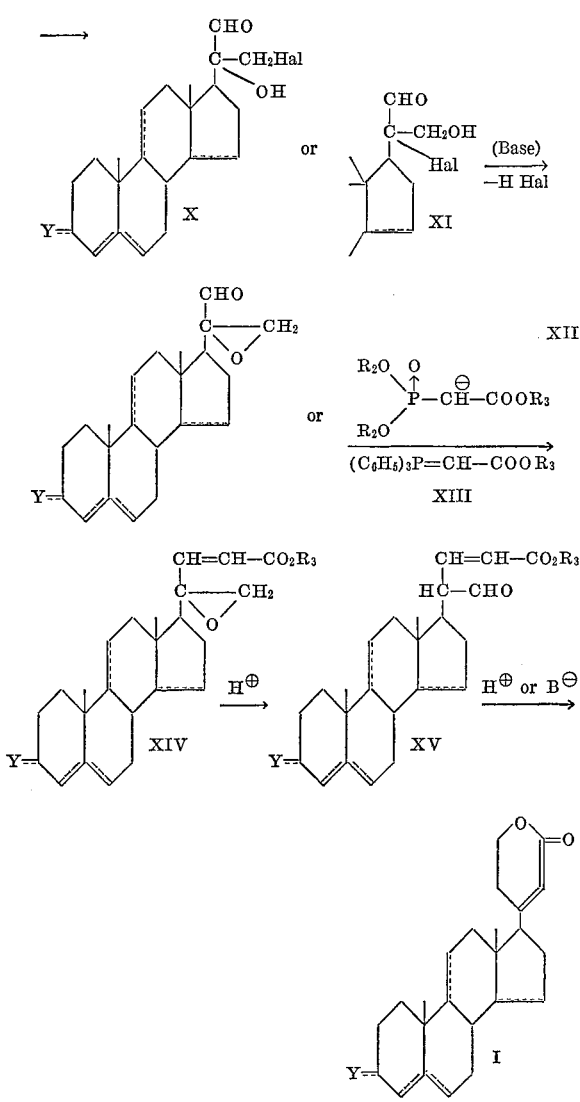

In the above formulae Y, Hal, $R_1$, $R_2$ and $R_3$ have the meanings given above.

Any hydrogen atoms present in the 5- and 14-positions of the steroid nucleus may have the α- or β-configuration.

As starting materials used in the process via either route there may be mentioned, for example, the 21-acetals of the following steroids:

3-hydroxy-$\Delta^5$- or -$\Delta^4$-pregnene-20-one-21-als,
3,15-dihydroxy-$\Delta^5$- or -$\Delta^4$-pregnene-20-one-21-als and
3-hydroxy-$\Delta^5$- or -$\Delta^4$-pregnene-15,20-dione-21-al-15-ketals of the 3α,3β,14α- and 14β-series,
3-hydroxy-$\Delta^{4,14}$- or -$\Delta^{5,14}$-pregnadiene-20-one-21-als of the 3α- and 3β-series,
3-hydroxy-pregnane-20-one-21-als,
3,15-dihydroxy-pregnane-20-one-21-als and
3-hydroxy-pregnane-15-20-dione-21-al-15-ketals of the 3α-, 3β-, 5α-, 5β-, 14α- and 14β-series, and also
3-hydroxy-$\Delta^{14}$-pregnene-20-one-21-als of the 3α, 3β-, 5α- and 5β-series.

There may also be used, for example, the 21-acetals of the 3-ketals, 3-thioketals, 3-enamines, 3-enol-ethers and 3-enol-esters of the following steroids:

3-keto-$\Delta^4$-pregnene-20-one-21-als,
3-keto-$\Delta^4$-pregnene-15,20-dione-21-al-15-ketals,
3-keto-$\Delta^4$-pregnene-15-hydroxy-20-one-21als of the 14α- and 14β-series and
3-keto-$\Delta^{14}$-pregnene-20-one-21-als of the 5α- and 5α-series,
3-keto-$\Delta^{4,14}$-pregnadiene-20-one-21-als, and also
3-keto-pregnane-20-one-21-als,
3-keto-pregnane-15,20-dione-21-al-15-ketals and
3-keto-15-hydroxy-pregnane-20-one-21-als of the 5α, 5β-, 14α- and 14β-series.

Derivatives of the above steroids which contain a $\Delta^{9(11)}$-or $\Delta^{11(12)}$-double bond may also be used.

The derivatives of the aforesaid steroid compounds which are esterified and/or etherified in the 3- and/or 15-position may also be used.

As carboxylic acids with which the hydroxyl groups may be esterified, there may be mentioned, for example, aliphatic saturated or unsaturated carboxylic acids containing 1 to 20 carbon atoms, for example, formic acid, acetic acid, propionic acid, palmitic acid, stearic acid, oleic acid, aromatic carboxylic acids, for example, benzoic acid, araliphatic acids, such as phenyl acetic acid, and cycloaliphatic acids, such as cyclohexane carboxylic acid.

As residues with which the 3- and/or 15-hydroxyl groups may be etherified, there may be mentioned, for example, aliphatic alkyl residues, for example, methyl or ethyl, cycloaliphatic residues, for example, cyclohexyl, araliphatic residues, for example, the benzyl residue, and also tetrahydropyranyl residues that may be substituted. As substituents in the tetrahydropyrane ring there may be mentioned, for example, carboxyl or carbalkoxy groups, lower alkyl or alkenyl residues. Thus, there may be used, for example, tetrahydropyrane-derivatives of the formula

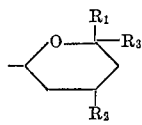

which are easily obtainable in a manner analogous to that described in J. Am. Chem. Soc. 73, 5270 (1951), and in which formula $R_1$ and $R_2$ each represent hydrogen or alkyl residues, and $R_3$ is the carboxyl group or a carbalkoxy group. The tetrahydropyranyl-steroid derivatives can be obtained as described in U.S. patent application Ser. No. 667,368 (see also Belgian specification No. 705,072).

As enol-ether, enol-ester and enamine derivatives, from which the aforesaid 3-keto-steroid compounds are derived, there may be mentioned derivatives containing lower alkyl groups such as the methyl or ethyl group, and as thioketal derivatives those of lower alkane dithiols, for example, ethane dithiol.

There may also be mentioned as starting materials those derivatives of the said steroid compounds that contain hydroxyl groups in the 4- and/or 6-position, which hydroxyl groups may likewise be etherified or esterified.

The 21-acetals can be prepared from the aforesaid steroid compounds, for example, in a manner analogous to that described in Helv. Chim. Acta 22, 1132 (1939). For acetalising the aldehyde group in 21-position there may be mentioned in this connection monohydric aliphatic alcohols, for example, methyl or ethyl alcohol, araliphatic alcohols, for example, benzyl alcohol, and dihydric acohols, for example, ethylene glycol and neopentyl glycol.

The aforesaid alcohols can also be used for ketalising any keto-groups in the 3- or 15-position.

The reaction of the 21-dialkoxy-20-keto-steroid-derivatives of the general Formula II by the Wittig method in route (a) is carried out with a triphenyl-oxymethyl-phosphonium halide of the general Formula III, in which $R_1$ is, for example, a methyl, ethyl, phenyl or para-tolyl group. As bases there are used principally organo-metallic bases such as alkali metal or alkaline earth metal alkyls and aryls, for example, phenyl-lithium or n-butyl-lithium, and also alkali metal or alkaline earth metal alcoholates and hydrides, such as sodium or potassium methylate, ethylate, tert-butylate or hydride, and strongly basic anions, for example, the dimethylsulphinyl anion $CH_3SOCH_2^{\ominus}$.

As solvents there are suitable ethers, for example, diethyl ether, tetrahydrofurane, dioxane, glycol dimethyl ether, diethylene glycol dimethyl ether, and also dimethyl sulphoxide, dimethyl-formamide, aromatic or aliphatic hydrocarbons, for example, benzene, toluene, hexane, methylene chloride, and alcohols, such as methanol, ethanol or tert.-butanol or mixtures of these solvents.

For carrying out the reaction, the starting material is dissolved or suspended in one of the said solvents, and the mixture added to a solution or suspension that contains one of the said bases and also one of the said phosphonium salts or the ylide formed from the two components. Alternatively this procedure may be reversed, or according to choice two of the reactants may be added to the third. Both the base and the phosphonium salt are advantageously used in an excess of, for example, 1 to 10 mol equivalents, and preferably from 1 to 5 mol equivalents. The molar ratio of base to phosphonium salt is advantageously about 1:1.1. The reaction is carried out at a temperature within the range from $-50°$ C. to the boiling temperature of the solvent used, and preferably from $0°$ C. to the boiling temperature of the solvent. The reaction times may be from 1 minute to about 48 hours, and in general the reaction terminates between 30 minutes and 12 hours.

The resulting 21-dialkoxy-20-alkoxy- or -aryloxy or -alkylaryloxy-methylene-steroid derivative of the Formula IV is isolated by generally known methods, and is then in a crude or purified form subjected to subsequent hydrolysis to form the 21-oxo-20-alkoxy- (or -aryloxy- or alkylaryloxy-) methylene compound, or is hydrolysed in the reaction solution without being isolated.

The hydrolysis of the 21-acetal group is generally carried out in solution or suspension in an organic solvent, the solvent being either miscible with water, for example, a lower alcohol, tetrahydrofurane, dioxane, dimethyl sulphoxide, dimethyl-formamide, diethylene glycol dimethyl ether or glycol dimethyl ether, or immiscible with water, such as an aliphatic or aromatic hydrocarbon, a chlorinated hydrocarbon, or in a mixture of these solvents, either with the use of a strongly polarising solvent such, for example, as dimethyl sulphoxide, without any further additive, in the other solvents by the addition of a base or an acid with the addition of water or in the anhydrous state, in a homogeneous or heterogeneous phase. There may be used, for example, inorganic acids such as hydrochloric acid, sulphuric acid, phosphoric acid, perchloric acid, and also buffer mixtures, or organic acids, for example, acetic acid, formic acid, oxalic acid, pyridine hydrochloride or Lewis acids, for example, boron trifluoride, zinc chloride or ammonium chloride, or inorganic bases, such as caustic soda solution, caustic potash solution, calcium hydroxide or sodium bicarbonate, or organic bases, such as alkali metal or alkaline earth metal alcoholates, for example, sodium or potassium methylate, ethylate or tert.-butylate, or alkali metal or alkaline earth metal hydrides, or amides, or organo-metal bases such, for example, as phenyl-lithium or n-butyl-lithium, or basic anions, for example, the dimethyl-sulphinyl anion, $CH_3SOCH_2^\ominus$, or basic, acid or neutral adsorbents, such as aluminium oxide, kieselguhr or the like. Acids and bases are used in catalytic or equimolar quantities, or in excess. Buffer solutions may also be used.

The reaction is carried out at a temperature from $-50°$ C. up to the boiling temperature of the solvent used, and preferably from $-20°$ C. up to room temperature. The reaction times may be from 1 minute to about 24 hours, and in general the reaction terminates between 5 minutes and 6 hours.

The end point of the hydrolysis of the acetal grouping, which at higher temperatures is more rapid and at lower temperatures takes a longer time, can be established by determining the end point of the partial hydrolysis by infra-red spectroscopy.

The resulting 21-oxo-20-alkoxy- or -aryloxy- or-alkyl- aryloxy-steroid derivative is isolated by generally known methods, and is reacted in a crude or purified form with a carbalkoxymethyl-dialkyl phosphonate of the general formula V in the presence of an anhydrous base in an inert organic solvent.

As a phosphonate of the Formula V, a carbomethoxy-methyl-dimethyl or -diethyl phosphonate or a carbethoxy-methyl-dimethyl or -diethyl phosphonate is preferably used.

As bases there are principally used alkali metal or alkaline earth metal hydrides or amides, or alkali metal or alkaline earth metal alcoholates, and preferably sodium or potassium hydride, amide, methylate, ethylate or tert.-butylate, or basic anions such, for example, as

The compound of the general Formula IV is added as a solution or suspension in an inert organic solvent to a solution or suspension of one of the said bases and one of the said phosphonates. This procedure may be reversed or the phosphonate may be added to the other two reactants premixed.

As solvents, ethers, preferably diethyl ether, tetrahydrofurane, dioxane, glycol dimethyl ether or diethylene glycol dimethyl ether, dimethyl sulphoxide, dimethylformamide, or aromatic or aliphatic hydrocarbons, for example, benzene, toluene or hexane, or alcohols, such as methanol, ethanol or tert.-butanol, or mixtures of these solvents are suitable.

Both the base and the phosphonate are advantageously used in an excess of, for example, 1 to 10 mol equivalents, and preferably of 1 to 6 mol equivalents. The reaction is carried out at a temperature within the range from $-50°$ C. to the boiling temperature of the solvent used, and preferably from $20°$ C. to the said boiling temperature. The reaction times may be between 1 minute and 24 hours, and the reaction generally terminates in 30 minutes to 6 hours.

The resulting compound of the General Formula VI is isolated by known general methods and is subjected to ring closure in solution or suspension in a suitable aqueous or anhydrous solvent in the presence of a suitable acid. Suitable acids include inorganic acids such as sulphuric acid, hydrochloric acid, phosphoric acids, sodium hydrogen sulphate or hydrogen chloride gas, or organic acids, for example, para-toluene sulphonic acid, oxalic acid, acetic or formic acid, or Lewis acids, for example, boron trifluoride, or also pyridine hydrochloride, acetic anhydride or other acid agents. The reaction is carried out in a homogeneous phase or heterogeneous mixture at a temperature ranging from $-20°$ C. up to the boiling point of the solvent used, and preferably from $20°$ C. up to the said boiling temperature. As solvents there may be used organic solvents, for example, alcohols such as methanol, ethanol, isopropanol, tert.-butanol, glycol or diethylene glycol, or ethers, for example, diethyl ether, tetrahydrofurane, dioxane, glycol dimethyl ether or diethylene glycol dimethyl ether, or aromatic or aliphatic hydrocarbons for example, benzene, toluene or hexane, or ketones, for example, acetone, or dimethyl-formamide or dimethyl sulphoxide, or mixtures of the aforesaid solvents. The reaction times may range from 20 minutes to 48 hours.

The reaction according to route (b) of a 21-acetal-20-oxo-steroid derivative of the Formula II is carried out with a trimethyl sulphonium or trimethyl sulphoxonium halide of the general Formula VII or VIII, which halide reacts with a base in an inert solvent to form a trimethyl sulphonium ylide or trimethyl sulphoxonium ylide as an intermediate. This intermediate then reacts with a derivative of the Formula II to form a corresponding 20,22-oxido-steroid of the Formula IX.

As bases there are used principally organo-metallic bases such as alkali metal or alkaline earth metal hydrides, amides or alcoholates such as sodium or potassium hydride, amide, tert.-butylate or methylate, or the dimethyl sulphinyl anion $CH_3SOCH_2^{\ominus}$, or alkali metal or alkaline earth metal alkyls or aryls, for example, phenyl-lithium, n-butyl-lithium, or trityl-sodium.

As solvents for carrying out the reaction with the sulphonium compounds of the Formula VII or VIII, dimethyl sulphoxide, dimethyl-formamide, or ethers, for example, diethyl ether, tetrahydrofurane, dioxane, or diglym, or aromatic or aliphatic hydrocarbons, for example, benzene, toluene or hexane, or mixtures of these solvents are suitable. The steroid component is advantageously dissolved in a mixture of dimethyl sulphoxide and tetrahydrofurane. 1 to 5, preferably 2 to 3, molecular equivalents of trimethyl sulphonium iodide are suspended in the solution, and 1 to 5 molar equivalents, preferably 2 to 3 molar equivalents, of a solution of sodium dimethyl-sulphinylmethylide in dimethyl sulphoxide are introduced dropwise into the suspension at a temperature from $-50°$ C. to $+50°$ C., preferably from $0°$ C. to $+5°$ C. The reaction times range from 5 minutes to about 48 hours, and in general the reaction terminates in 1 to 12 hours. When trimethyl sulphoxonium iodide is used, it is of advantage to work in a similar manner, except that the reaction is carried out at a higher temperature, preferably at room temperature.

The resulting 21-dialkoxy-20,22-oxido steroid derivative of the Formula IX is isolated by known general methods and can be used in the succeeding reaction without further purification. The yields are quantitative.

The 21-dialkoxy-20,22-oxido-steroid of the Formula IX is first converted by treatment with a hydrohalic acid, for example, hydrochloric, hydrobromic or hydroiodic acid, in an inert solvent into a 21-oxo-20,22-halohydrin-steroid of the Formula X or XI, the treatment being advantageously carried out in the presence of water in order to hydrolyse the 21-dialkoxy group simultaneously to a 21-oxo-group. Other groups in the steroid molecule that are not stable to hydrolysis, for example, ketal, acetal, enol-ether or pyranyl-ether groups may be hydrolysed at the same time. As solvents there are used preferably those that are miscible with water, for example, alcohols, acetone or dimethyl-formamide. However, solvents that are immiscible or only slightly miscible with water, for example, chloroform, benzene, tetrahydrofurane or dioxane, may be used. The formation of the halohydrin and simultaneous hydrolysis of an acetal, ketal or pyranyl ether group is carried out at a temperature from $0°$ C. to the boiling temperature of the solvent used, and preferably from room temperature up to $80°$ C. The yield is quantitative.

The splitting off of hydrogen halide from a 21-oxo-20,22-halohydrin-steroid of the Formula X or XI to form the corresponding 20,22-oxido-compound is carried out under mild conditions, which leave intact the 21-oxo group which is very sensitive to alkalies, by means of a base capable of splitting off hydrogen halide. As bases there may be used organic bases for example, triethylamine, diethyl-aniline, pyridine, quinoline, collidine or 1,5-diazabicyclo (4.3.0)-nonenes. An inert solvent that is miscible with the base, for example, tetrahydrofurane, benzene or ethyl acetate, may be used as a diluent. Inorganic bases such as sodium bicarbonate, sodium carbonate or potassium carbonate, may also be used. Temperatures ranging from $-60°$ C. up to the boiling temperature of the base or solvent used, and preferably ranging from $0°$ C. up to room temperature, are used. Also in this case the reactions take place quantitatively. The resulting 21-oxo-20,22-oxido-steroid derivative is either reacted with a carbalkoxymethyldialkyl phosphonate of the general Formula XII in the presence of an anhydrous base in an inert organic solvent, or is reacted with a corresponding triphenyl phosphine-carbalkoxymethylene of the Formula XIII in an inert organic solvent.

As phosphonates there are advantageously used carbomethoxymethyl-dimethyl- or -diethyl-phosphonates or carbethoxymethyl-dimethyl- or -diethyl-phosphonates.

As bases there are used principally alkali metal or alkaline earth metal hydrides or amides or alkali metal or alkaline earth metal alcoholates, and preferably sodium or potassium hydride, amide, methylate, ethylate, or tert.-butylate, or basic anions, for example, $$CH_3SOCH_2^{\ominus}$$

The compound of the general Formula X or XI in the form of a solution or suspension in an inert organic solvent is added to a solution or suspension of one of the aforesaid bases and one of the aforesaid phosphonates. Alternatively the procedure may be reversed by adding the phosphonate to a mixture of the other two reactants.

Both the base and the phosphonate are advantageously used in stoichiometric proportions, calculated on the carbonyl component. However, they may be used in an excess of 1 to 6 mol equivalents. The reaction is carried out at a temperature within the range from $-50°$ C. to the boiling temperature of the solvent used, and preferably within the range from $-10°$ C. to $+10°$ C. The reaction times are between 1 minute and about 48 hours, and in general the reaction terminates between 5 and 60 minutes.

In the reaction with a triphenyl-phosphine carbalkoxymethylene, triphenylphosphine-carbomethoxy- or -triphenylphosphine-carbethoxymethylenes are advantageously used as phosphoranes. The solvents mentioned above may be used. It is of advantage to react a solution of the steroid with 1 to 10 mol equivalents of the phosphorane, advantageously 1 to 5 mol equivalents, in an atmosphere of nitrogen for 1 to 24 hours, preferably 1 to 16 hours, at a temperature within the range of from $0°$ C. to the boiling temperature of the solvent used.

In both modifications the reaction products are isolated by generally known methods. The yields are quantitative.

The isomerisation of the 20,22-oxido group in the resulting 21-carbalkoxymethylene-20,22-oxido-steroid derivative of the Formula XIV to form a 20-formyl group is carried out in the usual manner by means of an acid in an inert organic solvent. As acids there may be used Lewis acids, for example, $BF_3$-etherate, $AlCl_3$, $MgBr_2$, $SnCl_4$, $ZnCl_2$, $FeCl_3$, $TiCl_3$ or $TiCl_4$, or organic acids, for example, formic acid, acetic acid, propionic acid or paratoluene sulphonic acid, or mineral acids, for example, hydrochloric acid, sulphuric acid, phosphoric acid, polyphosphoric acid, perchloric acid, hydrobromic acid or hydriodic acid, or mixtures of these acids. When solvents are used in addition they are principally alcohols, for example, methanol or tert.-butanol, or ethers, for example, tetrahydrofurane or diglym, or esters, for example, ethyl acetate, or aromatic, aliphatic or aralipatic hydrocarbons, for example, benzene, toluene, cyclohexane or n-hexane, or chlorinated hydrocarbons, for example, carbon tetrachloride or chloroform, or carbon disulphide or mixtures of these solvents. Depending on the nature of the solvent and the reaction components the isomerisation is carried out at a temperature within the range from $-50°$ C. to the boiling temperature of the solvent or acid used. In many cases the isomerisation is associated with partial ring closure to the α-pyrone.

It is especially advantageous for the isomerisation of the 21-carbalkoxymethylene-20,22-oxido-grouping to the 21-carbalkoxymethylene-20-formyl-grouping to treat the steroid component for 1 to 60 minutes with an excess of $BF_3$-etherate in a solvent that is as non-polar as possible, for example, benzene, cyclohexane, carbon tetrachloride or a mixture of these solvents, at a temperature from $0°$ C. to $40°$ C. In this case also approximately quantitative conversions are obtained.

The resulting compound of the general Formula XV is isolated by generally known methods, and is subjected to ring closure in solution or suspension in a suitable aqueous or anhydrous solvent in the presence of a suitable acid or base. The ring closure in an acid medium is carried out with the same agents and under the conditions described above for subjecting the compounds of the Formula VI to ring closure in accordance with route (a).

For alkaline ring closure there are advantageously used as bases alkali metal or alkaline earth metal alcohols, for example, sodium methylate or potassium tertiary butylate, or alkali metal or alkaline earth metal hydroxides for example, calcium hydroxide or barium hydroxide, or alkali metal or alkaline earth metal amides or hydrides.

The yields both in the alkaline and acid ring closure may amount to up to 80 percent of the theoretical yields.

If hydrolysable groups, such as ketal, ether, ester, enol-ether or enol-ester groups have been hydrolysed in these reactions accordingly to route (a) or (b), they may, if desired, be reintroduced by the usual general methods.

The process of the invention is very unexpected. Thus, it could not have been foreseen, for example, that in the process according to route (a) the hydrolysis of the 21-dialkoxy-20-alkoxy- or -aryloxy- or -alkylaryloxy-methylene-steroid derivatives of the general Formula IV proceeds selectively, in that the acetal group in the 21-position is hydrolysed without the enol-ether group in the 20-position being attacked. In the process according to route (b) it is surprising that $\alpha,\beta$-oxido-aldehydes, which are as a rule quite unstable and therefore can be obtained only with difficulty, can in the present case be obtained as 2-oxo-20,22-oxido-steroid derivatives in a simple manner and in almost quantitative yield in the process of the invention, without the aldehyde group undergoing side reactions (for example, aldol-condensation, Cannizzaro reaction) under the influence of bases capable of splitting off hydrogen halide. Furthermore, it could not have been expected that the 21-oxo-20,22-oxido-steroid derivatives would react with the anions of the carbalkoxymethyl-dialkyl phosphonates or with the triphenyl-phosphine-carbalkoxy-methylenes strictly selectively only at the 21-oxo group and not also at the 20,22-oxido group, and also that the 21-oxo-20,22-oxido-steroids, in spite of their strong sensitivity to alkalies, would react smoothly and rapidly with the strongly basic anions of the carbalkoxy-methyl-dialkyl-phosphonates only with the olefinisation of the 21-oxo group without aldehyde side reactions.

The products of the process possess valuable pharmacological properties. Thus, for example, in pharmacological tests on animals the products $\beta$-($3\beta$-hydroxy-$\Delta^5$-androstene-$17\beta$-yl)-$\alpha$-pyrone and 14-anhydro-scillarenone exhibit positive inotropic activities in the sense of an effect in increasing the force of contraction of the heart muscle. In order to prove the positive inotropic action the following pharmacological procedures were carried out:

(1) Potassium elimination on isolated hearts of guinea-pigs according to Langendorff: a strong elimination of potassium ions was observed at doses of 10 to 500$\delta$ per heart.

(2) Action on the isolated left auricles of hearts of guinea-pigs: at doses of 10 to 250$\delta$ (per 50 ml. of cardiac Ringer solution), an increase in the magnitude of the beat of the order of that produced with digoxin was obtained.

(3) Influencing the cardiac insufficiency of rats having renal hypertension: the cardiac insufficiency of hypertensive rats can be redressed by doses of 50 to 250$\delta$ per kg. of body weight.

Furthermore, the products of the process exhibit additional valuable pharmacological actions, for example, diuretic and cardiovascular actions and can also be used as intermediate products for the preparation of other valuble pharmacologically active compounds.

Thus, for example, by introducing a 14$\beta$-hydroxyl group into the products of the process scillarenone is obtained. This can be converted by reduction of the 3-keto group into scillarenine that has hitherto been obtainable only from natural sources.

The products of the process can be used as medicaments in the therapy of cardiac insufficiency in human medicine. They can be administered intravenously in the form of solutions for injection or orally in the form of dragées, tablets or drops.

For these purposes the products of the process can be made up as active substances with the usual carriers, such as lactose, starches, tragacanth or magnesium stearate.

The following examples illustrate the invention. In all these examples the processes were carried out in an atmosphere of nitrogen. The infra-red spectra were measured in potassium bromide and the ultra-violet spectra in methanol.

EXAMPLE 1

(1) The 3-tetrahydropyanyl ethers of $3\beta$-hydroxy-20,22-oxido-$\Delta^5$-bisnor-cholene-21-al-dimethylacetal (a) Preparation of the 3-tetrahydropyranyl ether from the corresponding 3-hydroxy-compound.—44.5 grams of $3\beta$-hydroxy-$\Delta^5$-pregnene-20-one-21 - oxo - dimethylacetal were dissolved in 330 ml. of absolute tetrahydrofurane, and 16 ml. of freshly distilled dihydropyrane and a few drops of phosphorus oxychloride were added while stirring and under nitrogen. After being stirred for 4 hours at room temperature the whole was poured into sodium bicarbonate solution, the solvent was distilled off to a great extent, and the precipitate was filtered off, washed neutral with water, and recrystallised from n-hexane. There were obtained 51 grams of the tetrahydropyranyl ether of $3\beta$-hydroxy-$\Delta^5$-pregnene-20-keto-21-oxo-dimethylacetal melting at 78 to 95° C.

(b) 13.2 grams of trimethyl-sulphonium iodide were suspended in a solution of 13.2 grams of the 3-tetrahydropyranyl ether of $3\beta$-hydroxy-20-oxo-$\Delta^5$-pregnene-21-al-dimethylacetal in 200 ml. of absolute dimethyl sulphoxide. In the course of 30 minutes there was added dropwise at 0° C., while stirring, a solution of sodium dimethyl-sulphinyl-methylide in absolute sulphoxide (prepared from 1.44 grams of sodium hydride in 60 ml. of dimethyl sulphoxide). After being stirred for 2 hours at 0° C. and for 2 hours at 20° C., the reaction mixture was poured into 1.2 litres of water adjusted to a pH-value of 7 by means of a phosphate buffer, and after a short time the reaction product precipitated out in the form of white crystals. After filtering off the precipitate, washing it with water and drying it over $P_2O_5$ in vacuo, there were obtained 13.5 grams of the 3-tetrahydropyranyl ether of $3\beta$-hydroxy-20,22-oxido-$\Delta^5$-bisnor-cholene - 21 - al - dimethylacetal melting at 93 to 95° C. (not sharply), which was free from impurities and was used in the succeeding reaction without further treatment. Its infra-red spectrum no longer showed the presence of CO-bands.

(c) A solution of sodium dimethyl-sulphinyl-methylide in dimethyl sulphoxide (prepared by heating for 1 hour 240 mg. of sodium hydride in 10 ml. of absolute dimethyl sulphoxide at 70° C. until all the hydride was consumed) was added dropwise, while stirring, to a suspension of 2.23 grams of trimethyl-sulphoxonium iodide in 7 ml. of absolute dimethyl sulphoxide and 33 ml. of absolute tetrahydrofurane at 20° C. After stirring the whole for a further 20 minutes at 20° C., there was added in one portion a solution of 2.2 grams of the 3-tetrahydropyranyl ether of $3\beta$-hydroxy-20-oxo-$\Delta^5$-pregnene-21-al-dimethyl-acetal in 5 ml. of absolute tetrahydrofurane. After stirring the reaction mixture for 6¼ hours at room temperature, it was poured into water adjusted to a pH-value of 7 with a phosphate buffer, and after a short time a crystallisate precipitated out. The crystallisate was filtered off, washed neutral with water, and dried over $P_2O_5$. There were obtained 2.25 grams of the 3-tetrahydropyranyl of $3\beta$-hydroxy-20,22-oxido-$\Delta^5$-bisnor-cholene-21-al-dimethyl-acetal, which was found to have the same physical and spectral properties as under (b).

(2) 3β-hydroxy-21-oxo-Δ⁵-bisnor-cholene-20,22-bromhydrin (VII)

A solution of 16.8 grams of the tetrahydropyranyl ether of 3β - hydroxy - 20,22-oxido-Δ⁵-bisnor-cholene-21-al-dimethyl-acetal in 336 ml. of acetone ("Merck," for analysis) and 336 ml. of tetrahydrofurane ("Merck," pure) was mixed with 100 ml. of distilled water and 100 ml. of aqueous hydrobromic acid of 48 percent strength, and the whole was then boiled for one hour under reflux. The whole was then cooled the solvent was removed to a considerable extent in vacuo, and the residue was poured into about 1.5 litres of water. The precipitated crystallisate was filtered off, washed with water, and dried in vacuo over $P_2O_5$. There were obtained 2.5 grams of 3β-hydroxy-21-oxo-Δ⁵-bisnor-cholene-20,22-bromhydrin melting at 114 to 115° C. Its infra-red spectrum showed that acetal- and pyranyl-ether bands were no longer present. The new bands were at 3,410 and 1,720 cm.⁻¹.

(3) 3β-hydroxy-20,22-oxido-21-oxo-Δ⁵-bisnor-cholene (VIII)

13.5 grams of crude 3β-hydroxy-21-oxo-Δ⁵-bisnor-cholene-20,22-bromhydrin were dissolved in 96 ml. of absolute tetrahydrofurane and mixed with 146 ml. of freshly distilled absolute triethylamine. After being allowed to stand for 16 hours at 20° C., the reaction mixture together with the precipitated triethylamine-hydrobromine was poured into 800 ml. of water and about 200 ml. of methanol. The crystallisate that precipitated out after a short time was filtered off, washed well with water and dried. 11.0 grams of 3β-hydroxy-20,22-oxido-21-oxido-Δ⁵-bisnor-cholene melting at 176 to 182° C. were obtained. The compound was used in the succeeding reaction without being recrystallised. It exhibited characteristic infra-red bands at 3,420, 2,725 and 1,720 cm.⁻¹.

(4) 3β-hydroxy-20,22-oxido-21-carbomethoxy-methylene-Δ⁵-bisnor-cholene (XI)

To a suspension of 396 mg. of sodium hydride in 33 ml. of absolute tetrahydrofurane there were added dropwise, while stirring at 0° C., 4.2 grams of carbomethoxy-methyldiethyl-phosphonate. When the evolution of hydrogen terminated, a solution of 5.6 grams of 3β-hydroxy-20,22-oxido-21-oxo-Δ⁵-bisnor-cholene in 49 ml. of absolute tetrahydrofurane was added dropwise at 0° C., while stirring. Immediately after the addition of the carbonyl component the pH-value was 7. After stirring for a total of 40 minutes at 0° C., the reaction mixture was poured into a mixture of water, alcohol and sodium chloride, whereupon the initially oily precipitated reaction product soon crystallised throughout. By filtering off the crystallisate, washing it with water and drying it over $P_2O_5$ in vacuo, 6.3 grams of crude 3β-hydroxy-20,22-oxido-21-carbomethoxymethylene-Δ⁵ bisnor-cholene melting at 133 to 140° C. were obtained which, after recrystallisation from a large quantity of ether, melted at 149 to 153° C. The compound exhibited characteristic infra-red bands at 3,460 and 1,720 and shoulders at 1,700 and 1,650 cm.⁻¹, and in the ultraviolet spectrum at 220 to 221 mμ ($\epsilon$= 11,300).

(5) 3β-hydroxy-20-formyl-21-carbomethoxy-methylene-Δ⁵-pregnene (XII)

(a) 3.6 grams of crude, unrecrystallised 3β-hydroxy-20,22 - oxido - 21 - carbomethoxymethylene - Δ⁵ - bisnor-cholene, that had been cautiously dried over $P_2O_5$, were dissolved in 288 ml. of absolute benzene, 3.6 ml. of boron trifluoride etherate were added, and the whole was stirred for 5 minutes at 20° C. The mixture was then poured into a solution of 6.3 grams of $NaHCO_3$ in 100 ml. of water, a sufficient quantity of methylene chloride was addded to form a well separated and unitary organic phase, the latter was separated, then washed neutral with water, and the solvent was evaporated in vacuo. The foamy residue that remained behind (3.6 grams after being dried) was found by infra-red spectrum analysis to consist of 3β - hydroxy - 20 - formyl - 21-carbomethoxy-methylene-Δ⁵-pregnene, which was used in the ring closing reaction without further purification. It had characteristic infra-red bands at 3,420, 2,700, 1,715 and 1,640 cm.⁻¹, and in the ultra-violet spectrum at 220 to 221 mμ ($\epsilon$=10,100).

(b) 250 mg. of 3β-hydroxy-20,22-oxido-21-carbomethoxymethylene - Δ⁵ - bisnor-cholene were dissolved in 10 ml. of absolute benzene and absolute cyclohexane and 3 ml. of boron trifluoride etherate were added. After standing for 5 minutes at 20° C. the product was worked up as described under 5(a) above. The reaction product obtained was the same as that under (a).

(c) 250 mg. of 3β-hydroxy-20,22-oxido-21-carbomethoxymethylene-Δ⁵-bisnor-cholene were dissolved in 20 ml. of absolute carbon tetrachloride, and 1 ml. of boron trifluoride etherate was added. After standing for 5 minutes at 20° C., the further treatment was as described under (a). The reaction product was the same as that given under (a).

(6) 3β-formoxy-20-formyl-21-carbomethoxy-methylene-Δ⁵-pregnene 500 mg. of 3β-hydroxy-20,22-oxido-21-carbomethoxy-methylene-Δ⁵-bisnor-cholene were dissolved in 1.5 grams of formic acid of 99 to 100 percent strength, and the whole was boiled for 4 hours under reflux. The mixture was then poured into water, and after standing for a long time an oily residue was formed that could be decanted off, and which was taken up with methylene chloride. After washing the solution with water the solvent was distilled off. There remained behind 430 mg. of 3β-formoxy - 20 - formyl - 21 - carbomethoxymethylene-Δ⁵-pregnene in the form of a foam. It had characteristic infra-red bands at 2,700, 1,710–1,720, 1630 and 1,170 cm.⁻¹.

(7) (3β-hydroxy-Δ⁵-androstene-17β-yl)-α-pyrone (I)

(a) 3.4 grams of the product obtained as described under 5(a) above were dissolved in 680 ml. of methanol ("Merck," for analysis) and 26 ml. of concentrated hydrochloric acid and also 26 ml. of distilled water were added. After boiling the mixture for 16 hours under reflux, the reaction mixture was poured into water. The precipitated crystalline residue was filtered off, washed with water, and dried over $P_2O_5$ in vacuo. There were obtained 2.9 grams of pseudo-crystalline crude, still impure (3β - hydroxy - Δ⁵ - androstene - 17β-yl)-α-pyrone which in the ultra-violet spectrum exhibited a $\lambda_{max}$ of 297–300 mμ ($\epsilon$=3,520). By repeated recrystallisation from a small amount of acetone and a mixture of methylene chloride and acetone, a pure product having the following properties was obtained:

melting point 239–240° C.
ultra-violet max: λ 299–300 mμ ($\epsilon$=5,790)
characteristic infra-red bands at 3,440, 1,690–1,720 shoulders at 1,735, 1,620, 1,530 cm.⁻¹.

(b) In a further batch prepared in a similar manner the crude precipitated α-pyrone was purified by chromatography on aluminum oxide, Woelm, acid, Akt. St. II (column dimensions 3 x 16 cm.). The substance was applied in methylene chloride. Elution was then carried out with 1600 ml. of ether to yield an oily by-product. Subsequent elution with about 1 liter of methylene chloride yielded, after spraying with ether, the desired α-pyrone having the same properties as those given above for the recrystallised product.

(c) 800 mg. of the product obtained as described under 5(a) above, were dissolved in 300 ml of absolute tert.-butanol and 225 mg. of potassium tert.-butylate were added. After stirring for 50 minutes at between 45° C. and 55° C., the reaction mixture was poured onto water The precipitate that separated out was filtered off with suction, washed with water and dissolved with methylene chloride. It was then chromatographed on Al$_2$O$_3$, Woelm, acid, Akt. St. II (column dimensions: 2 x 13 cm.). Elution with 500 ml. of ether yielded a by-product, and further elution with 300 ml. of methylene chloride yielded the desired α-pyrone which, after being sprayed with ether, was crystallised. Its physical and spectral properties were as described under (a).

(d) 380 mg. of the product obtained under (6) was boiled under reflux for 16 hours with 60 ml. of methanol, 5 ml. of water and 5 ml. of concentrated hydrochloric acid. The mixture was then poured into water, the precipitate that separated out was filtered off and dried (330 mg. crude yield). The product was recrystallised from a small amount of acetone and also a mixture of methylene chloride and acetone. There was obtained the α-pyrone having the same properties as given under (a).

δ-[3β-hydroxy-Δ$^{5,14}$-androstadiene-17β - yl] - (α-pyrone) and
δ-[3-oxo-Δ$^4$-androstene-17β-yl]-(α-pyrone) can be prepared in an analogous manner.

EXAMPLE 2

14-anhydro-scillarenone=(Δ$^{4,14}$-androstadiene-3-one-17-yl)-α-pyrone=3-oxo-bufa-4,14,20,22-tetraenolide (a) 3-ethoxy-20,22-oxido-Δ$^{3,5,14}$-bisnor-cholatriene-21-al-dimethylacetal.—40.1 grams of trimethyl-sulphonium iodide were suspended in an atmosphere of nitrogen in a solution of 26.5 grams of 3-ethoxy-Δ$^{3,5,14}$-pregnatriene-20-one-21-al-21-dimethylacetal in 380 ml. of absolute tetrahydrofurane and 76 ml. of absolute dimethyl sulphoxide. In the course of one hour there was introduced dropwise, while stirring at 0° C., a solution of sodium dimethyl-sulphinyl-dimethylide (prepared from 4.19 grams of sodium hydride in 180 ml. of absolute dimethyl sulphoxide at 70–75° C. until the evolution of hydrogen ceased). After stirring the mixture for one hour at 0° C. and 3.5 hours at 20–25° C., the dark colored reaction mixture was poured into 3.3 liters of a phosphate buffer (pH-value of 7), whereupon the reaction product precipitated out in a crystalline form. After the mixture stood overnight, the crystallisate was filtered off, washed well with water, and freed from the last traces of adherent water and dimethyl sulphoxide in a high vacuum and finally dried over P$_2$O$_5$. 25.7 grams of yellow-white 3-ethoxy-20,22 - oxido-Δ$^{3,5,14}$-bisnor cholatriene-21-al-dimethylacetal melting at 153–154° C. (sintering from 135° C.) were obtained. The compound was used in the succeeding reaction without further treatment. It had characteristic infra-red bands at 1,650 (pointed), 1,625 (pointed), 1,215, 1,170, 1,095 and 1,080 cm.$^{-1}$, no C=0: ultra-violet λ$_{max}$: 239–240 mμ, ε=20,200.

(b) Δ$^{4,14}$-bisnor-choladiene-3-one-21-al-20,22-bromhydrin.—A solution of 25 grams of 3-ethoxy-20,22-oxido-Δ$^{3,5,14}$-bisnor-cholatriene-21-al-dimethylacetal in 490 ml. of acetone ("Merck" p.A.) and 490 ml. of tetrahydrofurane (Merck "pure") was mixed with 150 ml. of distilled water and 150 ml. of aqueous hydrobromic acid of 48 percent strength ("Merck"), and the whole was boiled for one hour under reflux in a nitrogen atmosphere. The mixture was then cooled, the solvent was distilled off in vacuo to a considerable extent, and the residue was poured into about 4 liters of water. The precipitated crystallisate was filtered off, washed with water and dried in vacuo over P$_2$O$_5$. 23.5 grams of crude, yellow-brown Δ$^{4,14}$-bisnorcholadiene - 3 - one-21-al-20,22-bromhydrin melting at 205–208° C. (previously sintering) were obtained. The compound was used in the succeeding reaction without purification.

Beilstein test: positive
characteristic infra-red bands: enol-ether and acetal bands no longer present
new bands at 2,725, 3,460 (wide), 1,720 and 1,660 (wide), and shoulders at 1,630 and 1,610 cm.$^{-1}$.

(c) 20,22-oxido-Δ$^{4,14}$-bisnor-choladiene-3-one-21-al.—(1) 5.4 grams of Δ$^{4,14}$-bisnor-choladiene-3-one-21-al-20,22-bromohydrin were dissolved in 36 ml. of absolute tetrahydrofurane and 54 ml. of triethylamine ("Merck") were added. After standing for 15 hours at 20° C., the reaction mixture was poured into 600 ml. of water. The precipitated crystallisate was filtered off, washed with water and dried. There were obtained 4.1 grams of crude 20,22-oxido-Δ$^{4,14}$-bisnor-choladiene-3-one-21-al melting at 185–190° C., which, after digestion with cold ether having a temperature of −50° C., melted at 195–197° C. After recrystallisation from a mixture of methylene chloride and ether, the compound melted at 204–205° C. It exhibited characteristic infra-red bands at 2,720, 1,720, 1,655 and 1,610 cm.$^{-1}$, λ$_{max}$=238 mμ (ε=17,200).

(2) 41.5 grams of Δ$^{4,14}$-bisnor-choladiene-3-one-21-al-20,22-bromhydrin were dissolved in 600 ml. of absolute methylene chloride and 250 ml. of absolute triethylamine were added. After standing for 17 hours at 20° C., the solvent was distilled off to dryness in vacuo (at a bath temperature of 30–40° C.) and the resulting dark residue was introduced into water. The product was then extracted with methylene chloride, washed with water, and the solvent was removed in vacuo. 37.8 grams of a dark crystalline oil were obtained, which was purified by chromatography on silica gel (0.05 to 0.2 mm.: 70–325 mesh ASTM; Merck). The column had a height of 16 cm. and a diameter of 6 cm. The oil was applied to the column in methylene chloride and elution was carried out first with 8 liters of benzene and then with 2.5 liters of methylene chloride. After removing the solvent, there was obtained, after spraying with ether and filtering off the crystallisate obtained, 21.6 grams of pale 20,22-oxido-Δ$^{4,14}$-bisnor-choladiene-3-one-21-al melting at 204–205° C. The infra-red and ultra-violet spectra were completely identical with those of the products obtained under (a).

(d) 20,22 - oxido - 21 - carbomethoxymethylene-Δ$^{4,14}$-bisnor-choladiene-3-one.—To a solution, cooled to 2° C., of 7.3 grams of 20,22-oxido-Δ$^{4,14}$-bisnor-choladiene-3-one-21-al in 140 ml. of absolute tetrahydrofurane there was introduced dropwise at 0 to 5° C., while stirring, a solution, cooled to 0° C., of sodium carbomethoxy-methyl-diethyl-phosphonate (prepared by adding 5.5 grams of carbomethoxy ethyl-diethyl-phosphonate dropwise to a suspension of 535 mg of sodium hydride in 22 ml. of absolute tetrahydrofurane, while stirring, until the evolution of hydrogen ceased, and the solution was transparently clear). Any temperature rise that occurred was immediately suppressed by intense external cooling. After stirring for a total of 40 minutes at between 0° C. and 5° C., measurement showed that the pH-value was 8. The reaction mixture was then poured into one liter of water and rinsed out with 100 ml of methanol, whereupon the reaction product precipitated immediately in a crystalline form. After filtering off the product, washing and drying it, there were obtained 7.8 grams of 20,22-oxido-21 - carbomethoxymethylene-Δ$^{4,14}$-bisnor-choladiene - 3 - one melting at 178–180° C. which, after being recrystallised from a mixture of methylene chloride and ether, melted at 188° C. The compound exhibited characteristic infra-red bands at 1,710–1,715, 1,660, 1,610, 1,290 and 1,265 cm.$^{-1}$, and in the ultraviolet spectrum it had a λ$_{max}$=233 mμ (ε=22,900).

The same reaction product was obtained by working in the reverse manner and adding the solution of the steroid at 0° C. in one portion to the solution of the sodium phosphonate.

(e) 21 - carbomethoxymethylene - Δ$^{4,14}$ - bisnor - choladiene 3-one-22-al.—19.1 grams of cautiously dried 20, 22 - oxido - 21 - carbomethoxymethylene - Δ$^{4,14}$ - bisnor - choladiene-3-one were dissolved in 1.4 ml of absolute benzene, 18.9 ml. of boron trifluoride etherate were added, and the whole was stirred for 5 minutes at 21° C. The mixture was then filtered through a filter bed into a solution of 100 grams of NaHCO$_3$ in one liter of water, the benzene phase was separated off. and the aqueous phase was extracted with benzene. The combined benzene phases were washed neutral with water and the benzene was distilled off in vacuo. The foamy residue that remained behind (18.9 grams dry weight) was found by intra-red spectrum analysis to consist of 21-carbomethoxymethylene-$\Delta^{4,14}$-bisnor-choladiene-3-one-22-al, which was used in the succeeding reaction without further purification. It had characteristic infra-red bands at 1,715, 1,665, 1,605 and 1,595 (shoulder) cm.$^{-1}$ and in the ultra-violet spectrum the $\lambda_{max}$: 235–236 m$\mu$, $\epsilon$=20,500, and a weak $\lambda_{max}$ at 300 m$\mu$.

(f) 14-anhydro-scillarenone.—7.2 grams of crude 21-carbomethoxymethylene-$\Delta^{4,14}$-bisnor-choladiene-3-one-22-al were dissolved in 1.3 liters of methanol ("Merck" p.A.) and 130 ml. of concentrated hydrochloric acid were added. After boiling the mixture under reflux for 17 hours, the reaction mixture was poured into 2–3 liters of water, whereupon the reaction product precipitated. The crystallisate was filtered off, washed with water and dried. 6.1 grams of a crude product were obtained, the infra-red spectrum of which had the characteristic bands (see below) for the expected reaction product.

ultra-violet:
$\lambda_{max_1}$=330 m$\mu$, $\epsilon$=5,000
$\lambda_{max_2}$=236 m$\mu$, $\epsilon$=19,100.

In order to obtain the pure 14-anhydro-scillarenones the crude product obtained was chromatographed on Al$_2$O$_3$, Woelm, acid, Akt. St. II. The column had a height of 30 cm. and a diameter of 2.5 cm. The product was applied in methylene chloride, and eluted first with a mixture of ether and petroleum ether 1:1 (13 fractions each containing 250 ml. of eluting agent=fractions 1–13), and then with ether alone (6 fractions each containing 500 ml. of eluting agent=fractions 14–19). Fractions 1–3 contained a product melting at 260–262° C. (after recrystallisation from a mixture of methylene chloride and ether) which has not yet been more closely investigated. Fraction 4 contained a mixture of the above mentioned by-product and 14-anhydro-scillarenone. Fractions 5–19, yielded, after distilling off the solvent and spraying with ether, the desired 14-anhydro-scillarenone in a very pure form. It can be recrystallised from a mixture of methylene, acetone and ether. The product had characteristic infra-red bands at 1,735 (shoulder), 1,705–1,715 (wide), 1,655, 1,610 and 1,530 (pointed and strong) cm.$^{-1}$, and the ultra-violet spectrum: $\lambda_{max_1}$=236 m$\mu$, ($\epsilon$=17,700); $\lambda_{max_2}$=300 m$\mu$ ($\epsilon$=5,950).

14-anhydro-scillarenone apparently occurs in two different modifications. Depending on the choice of the conditions of working up the melting points may be:

melting point (1)=184–187° C.
melting point (2)=219–220° C.

The NMR, infra-red and ultra-violet spectra of both modifications are completely identical. Also in the thin-layer diagram both modifications have the same Rf-value.

The 3-ethoxy-20,22-oxido-$\Delta^{3,5,14}$-bisnor-cholatriene-21-al-dimethylacetal used as starting material was prepared as follows:

(a) $\Delta^{4(5),14(15)}$-pregnadiene - 3,20 - dione - 21-al-21-dimethylacetal.—12 grams of $\Delta^{4,14}$-pregnadiene-21-ol-3,20-dione (melting at 140–141° C.), obtained by the usual hydrolysis with potassium hydrogen carbonate in methanol of $\Delta^{4,14}$-pregnadiene-21-ol-3,20-dione-acetate (prepared as described in U.S. Patent 3,468,918), were dissolved in 240 ml. of methanol ("Merck"), and heated to 60° C. Immediately after the addition of 0.56 ml. of glacial acetic acid, a solution of 19 grams of cupric acetate and also 180 ml. of aqueous methanol of 80 percent strength were added, and the whole was then stirred for 20 minutes at 60° C. The whole was cooled, the solid matter was filtered off, and the blue-green reaction solution was stirred with 60 grams of pretreated Lewathit S 100 (twice stirred on each occasion with 2.5 liters of 4n-hydrochloric acid, decanted off, and washed neutral with water) until it became colorless. The solution was then filtered, washed with methanol, and concentrated in vacuo. Water was added to the turbid solution, and it was extracted with methylene chloride. After removing the extraction medium, 13.7 grams of $\Delta^{4,14}$-pregnadiene-3,20-dione-21-al were obtained in the form of a viscous yellow oil, which was used in the succeeding reaction without further purification.

For acetalysation 13.6 grams of the reaction product so obtained were dissolved in 360 ml. of absolute methanol containing one percent of hydrogen chloride, the reaction mixture was then heated for two hours under reflux, and then poured into 300 ml. of water which contained 15 grams of potassium carbonate. The mixture was extracted with methylene chloride, and, after removing the solvent, there were obtained 13.7 grams of an oily reaction product, which was further purified by chromatography on Al$_2$O$_3$, Woelm, neutral, Akt. St. II, (column height 20 cm. and diameter 3 cm.). Application and elution were carried out with a mixture of equal parts of benzene and petroleum ether.

After the passage of 1.5 liters of the elution medium, there were obtained, after distilling off the solvent and triturating with petroleum ether and filtering off, 9,2 grams of crystalline $\Delta^{4,14}$ - pregnadiene - 3,20 - dione-21-al-21-dimethylacetal melting at 70° C. The product had characteristic infrared bands at 1,720, 1,660, 1,615, 1,060 and 1,085 cm.$^{-1}$, no OH; the ultra-violet spectrum showed $\lambda_{max}$ 239 m$\mu$ ($\epsilon$=18,650).

(b) 3 - ethoxy - $\Delta^{3,5,14}$-pregnatriene-20-one-21-al-21-dimethylacetal.—15 grams of $\Delta^{4,14}$-pregnadiene-3,20-dione-21-al-21-dimethylacetal were suspended or dissolved in 150 ml. of absolute dioxane and also 15 ml. of ortho-formic acid triethyl ester, and, after the addition of 1.5 grams of para-toluene sulphonic acid, the whole was stirred for one hour at 20° C. The dark colored solution was then poured into a mixture of 210 ml. of water, 15 ml. of pyridine and 40 ml. of methanol, whereupon the reaction product precipitated in a crystalline form. By filtering off the crystallisate, washing and drying it, 15.3 grams of yellow colored 3-ethoxy-$\Delta^{3,5,14}$-pregnatriene-20-one-21-al-21-dimethylacetal melting at 126–128° C. were obtained. After recrystallisation from a mixture of methylene chloride and methanol, the compound melted at 131–132° C. It had characteristic infra-red bands at 1,710, 1,650 (pointed), 1,625 (pointed), 1,215, 1,170, 1,090 and 1,060 cm.$^{-1}$. The ultra-violet spectrum showed a $\lambda_{max}$=239 m$\mu$, $\epsilon$=21,150.

EXAMPLE 3

(a) The tetrahydropyranyl ether of 3$\beta$-hydroxy-$\Delta^5$-pregnene-20-keto-21-oxo-dimethylacetal.—44.5 grams of 3$\beta$-hydroxy - $\Delta^5$ - pregnene-20-one-21-oxo-dimethylacetal were dissolved in 330 ml. of absolute tetrahydrofurane, and the solution was mixed, while stirring and under nitrogen, with 16 ml. of freshly distilled dihydropyrane and a few drops of phosphorus oxychloride. After stirring for 4 hours at room temperature, the mixture was poured into sodium bicarbonate solution, the solvent was distilled off to a great extent, and the precipitate was filtered off, washed neutral with water and recrystallised from n-hexane. 51 grams of the tetrahydropyranyl ether of 3$\beta$-hydroxy-$\Delta^5$-pregnene-20-keto-21-oxo-dimethylacetal melting at 78–95° C. were obtained.

(b) The tetrahydropyranyl ether of 3$\beta$-hydroxy-$\Delta^5$-pregnene - 20 - methoxymethylene-21-al-dimethylacetal.—2.88 grams of sodium hydride were mixed with 70 ml. of absolute dimethyl sulphoxide under nitrogen and while stirring, and the mixture was maintained at 75–80° C. for 45 minutes. While cooling with ice, 45 grams of methoxy-methyl-triphenyl-phosphonium chloride were added dissolved in 200 ml. of absolute dimethyl sulphoxide, and then the mixture was stirred for a further 10 minutes at room temperature. 10 grams of the tetrahydropyranyl ether of 3$\beta$-hydroxy-$\Delta^5$-pregnene-20-keto-21-al-dimethylacetal dissolved in 120 ml. of absolute dimethyl sulphoxide were then added, and the whole was stirred for 15 hours at 55–60° C. After cooling, the mixture was stirred with 1.2 liters of diethyl ether, the precipitate was filtered off, and the filtrate was washed with water, dried over sodium sulphate, and evaporated. The residue was extracted by boiling with 400 ml. of petroleum ether. The filtrate was allowed to stand, then filtered to remove the crystallisate and evaporated. 14 grams of a crude product (oil) were obtained. The infra-red spectrum lacked 1,725–1,700 cm.$^{-1}$, but showed 1,645–1,660 cm.$^{-1}$.

(c) The tetrahydropyranyl ether of 3β-hydroxy-Δ$^5$-pregnene-20-methoxymethylene-21-al.—The crude product obtained under (b) was dissolved in 2.4 liters of dimethyl sulphoxide, the solution was adjusted to a pH-value of 5 with 20 ml. of 2N-acetic acid, allowed to stand for two hours at room temperature, adjusted to a pH-value of 4 with a further 118 ml. of 2N-acetic acid, allowed to stand for 45 minutes at room temperature, neutralised with sodium bicarbonate, extracted with ether, and the extract was washed with water, dried over sodium sulphate and evaporated. There were obtained 14 grams of an oil. Its infra-red spectrum exhibited bands at 2,695, 1,665, 1,610–1,635, 1,250, 1,050 and 1,020 cm.$^{-1}$. The ultra-violet spectrum showed CH$_3$OH λ$_{max}$=252.5 mμ (ε=max. 13,410 after purification by chromatography).

(d) The tetrahydropyranyl ether of 3β-hydroxy-20-methoxymethylene - 21 - carbomethoxymethylene-Δ$^5$-pregnene.—5.16 grams of sodium hydride were suspended in 120 ml. of absolute tetrahydrofurane and slowly mixed with 47.6 ml. of carbomethoxymethyl-diethyl-phosphonate under nitrogen and while stirring at room temperature. When the evolution of hydrogen had ceased and solution was complete, the whole was heated to boiling, and the crude product obtained under (c), dissolved in 200 ml. of absolute tetrahydrofurane, was added dropwise. Then the whole was boiled for 6 hours under reflux. The mixture was then diluted with ether, washed neutral with water, dried over sodium sulphate and evaporated. The residue was chromatographed on silica gel. After elution with mixtures of petroleum ether and benzene, 4 grams of crystals melting at 118–133° C. were obtained by a subsequent elution with ether. The infra-red spectrum showed bands at 1,705, 1,600, 1,240 and 1,020 cm.$^{-1}$. The ultra-violet spectrum showed CH$_3$OH λ$_{max}$=293 mμ (ε=15,200).

(e) (3β - hydroxy - Δ$^5$-androstene-17β-yl)-α-pyrone.— 100 mg. of the product obtained under (d) were dissolved in 20 ml. of methanol, 1.5 ml. of semiconcentrated hydrochloric acid were added and the whole was boiled for 14 hours under reflux. The mixture was then neutralised with sodium bicarbonate, extracted with ether, washed with water, dried over sodium sulphate, and evaporated. The crude product (98 mg.) was chromatographed on acid aluminum oxide. By eluting with ether there was obtained, after evaporation and crystallisation from ether, (3β-hydroxy-Δ$^5$-androstene-17β-yl)-α-pyrone. Its infra-red spectrum showed bands at 3,430, 1,740–1,700, 1,620–1,635 and 1,530 cm.$^{-1}$. The ultra-violet spectrum showed CH$_3$OH λ$_{max}$=298 mμ.

We claim:
1. A method for making an (androst-17β-yl)-α-pyrone of the formula

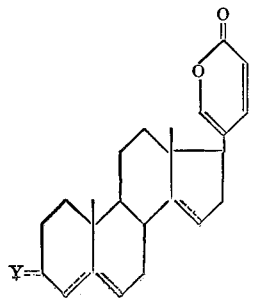

wherein Y is an oxo group, a Δ$^{3,5}$-enol ether or Δ$^{3,5}$-enol ester containing lower alkyl groups, a Δ$^{3,5}$-enamine group, or hydrogen and hydroxyl, the latter of which may be etherified with lower alkyl, benzyl, or tetrahydropyranyl, or esterified with lower alkanoyl, said α-pyrone further having additional double bonds optionally present in the 4-, 5-, or 14-position, or the 4- and 14-positions, or the 5- and 14-positions, which method comprises:

(1) reacting a corresponding 21-dialkoxy - 20 - ketosteroid of the formula

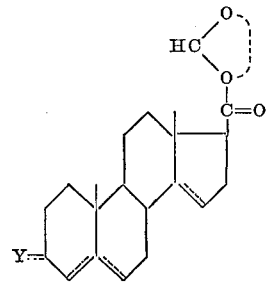

in which

is an open or cyclic acetal group and Y has its earlier meaning except that any keto group in the 3-position is protected, in a Wittig reaction with an oxymethyl-triphenyl-phosphonium halide of the formula

[(C$_6$H$_5$)$_3$PCH$_2$OR$_1$]Hal in which R$_1$ is alkyl, aryl, or alkylaryl and Hal is chlorine, bromine, or iodine, in an inert solvent in the presence of an anhydrous base to form the corresponding 21-dialkoxy-20-alkoxy- (or aryloxy- or alkylaryloxy-) methylene compound of the formula

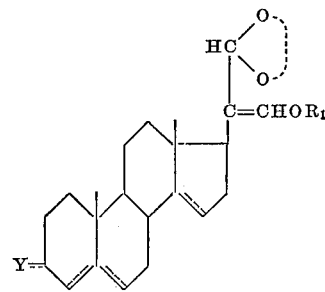

(2) selectively hydrolysing the last-mentioned compound of the corresponding 21-oxo-20-alkoxy- (or aryloxy- or alkylaryloxy-) methylene compound;
(3) reacting the hydrolysed compound with a carbalkoxy-methyl-dialkyl-phosphonate of the formula

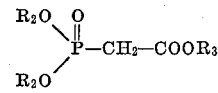

in which R$_2$ and R$_3$ are lower alkyl, in an inert organic solvent in the presence of an anhydrous base to form the corresponding 21-carbalkoxymethylene compound of the formula

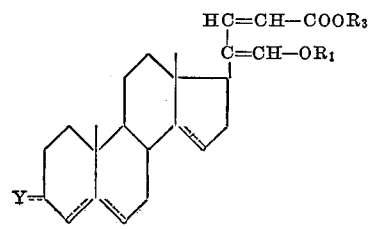

(4) hydrolysing said 21-carbalkoxy group in an acid or alkaline medium to form the corresponding carboxylic acid;
(5) subjecting the carboxylic acid compound to ring closure in an acid medium; and
(6) optionally interconverting oxo, hydroxy, ester, and ether groups present to yield the α-pyrone product in its desired form.

2. A method for making an (androst-17β-yl)-α-pyrone of the formula

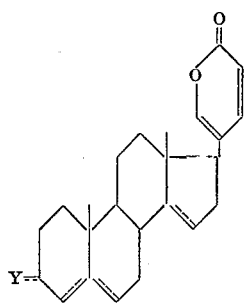

wherein Y is an oxo group, a $\Delta^{3,5}$-enol ether or $\Delta^{3,5}$-enol ester containing lower alkyl groups, a $\Delta^{3,5}$-enamine group, or hydrogen and hydroxyl, the latter of which may be etherified with lower alkyl, benzyl, or tetrahydropyranyl, or esterified with lower alkanoyl, said α-pyrone further having additional double bonds optionally present in the 4-, 5-, or 14-position, or the 4- and 14-positions, or the 5- and 14-positions, which method comprises:

(1) reacting a corresponding 21-dialkoxy-20-ketosteroid of the formula

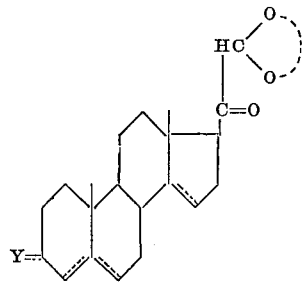

in which

is an open or cyclic acetal group and Y has its earlier meaning except that any keto group in the 3-position is protected, with a trimethylsulfonium halide of the formula

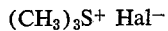

or a trimethylsulfoxonium halide of the formula

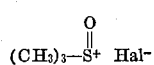

wherein Hal is chlorine, bromine, or iodine, in an inert organic solvent in the presence of an anhydrous base to form the corresponding 20,22-oxido-steroid of the formula

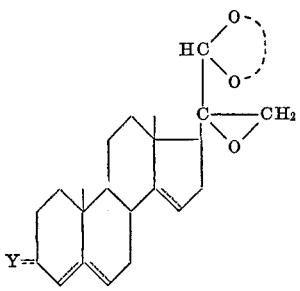

(2) reacting the last-mentioned compound with a hydrohalic acid to form a halohydrin of the formula

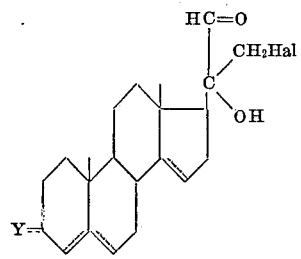

or

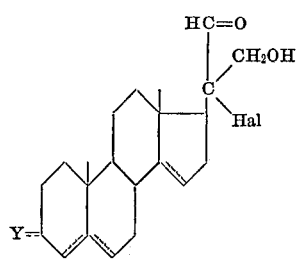

(3) reacting said halohydrin with a base to form the corresponding 21-oxo-20,22-oxido-steroid of the formula

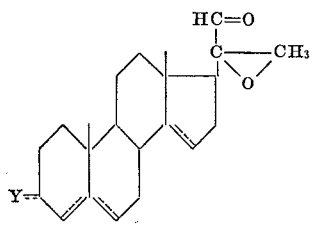

(4) reacting the last-mentioned compound with:
(a) a carbalkoxymethyl-dialkyl-phosphonate of the formula

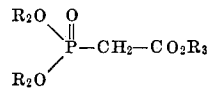

wherein $R_2$ and $R_3$ are lower alkyl, in an inert organic solvent in the presence of an anhydrous base, or
(b) with a carbalkoxymethyl - triphenyl - phosphorane of the formula

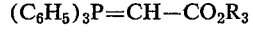

wherein $R_3$ is lower alkyl, to form the corresponding 21 - carbalkoxymethylene-20,22-oxidosteroid of the formula

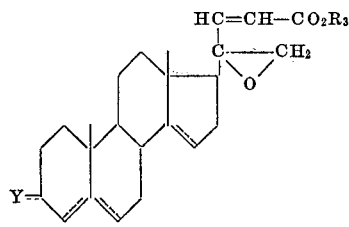

(5) isomerizing the last-mentioned compound with an acid to form the corresponding 21-carbalkoxymethylene-20-formyl compound of the formula

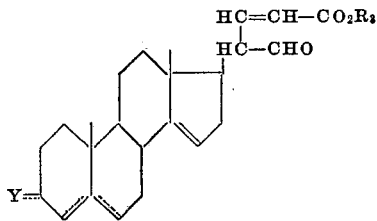

(6) hydrolysing said 21-carbalkoxy group in an acid or alkaline medium to form the corresponding carboxylic acid;
(7) subjecting the carboxylic acid compound to ring closure in an acid or alkaline medium; and
(8) optionally interconverting oxo, hydroxy, ester, and ether groups present to yield the α-pyrone product in its desired form.

3. ($\Delta^{4,14}$-androstadiene-3-one-17β-yl)-α-pyrone.

References Cited

UNITED STATES PATENTS

| | | | |
|---|---|---|---|
| 2,362,408 | 11/1944 | Ruzicka | 260—239.5 |
| 2,398,861 | 4/1946 | Ruzicka | 260—239.5 |
| 3,455,910 | 7/1969 | Fritsch et al. | 260—239.57 |

HENRY A. FRENCH, Primary Examiner

U.S. Cl. X.R.

260—239.55, 397.4, 397.47, 999